United States Patent [19]

Szabo et al.

[11] Patent Number: 5,151,400
[45] Date of Patent: Sep. 29, 1992

[54] PROCESS FOR THE ACTIVATION OF HALOGENATED CATALYSTS AND CATALYSTS OBTAINED BY SAID PROCESS FOR UTILIZATION IN HYDROCARBON CONVERSION PROCESSES

[75] Inventors: Georges Szabo, Montivilliers; Egbertus F. P. Schasfoort, Pays-Bas; Alain Milan, Montivilliers, all of France

[73] Assignee: Compagnie de Raffinage et de Distribution Total France, Levallois, France

[21] Appl. No.: 554,298

[22] Filed: Jul. 18, 1990

[30] Foreign Application Priority Data

Jul. 18, 1989 [FR] France ............... 89 09630

[51] Int. Cl.$^5$ ............... B01J 27/125; B01J 27/13; B01J 27/132; B01J 27/135
[52] U.S. Cl. ............... 502/203; 502/227; 502/228
[58] Field of Search ............... 502/203, 227, 228

[56] References Cited

U.S. PATENT DOCUMENTS

| 3,993,587 | 11/1976 | Olah et al. ............... 502/227 X |
| 4,201,696 | 5/1980 | Legendre et al. ............... 252/442 |
| 4,283,585 | 8/1981 | Legendre et al. ............... 585/482 |
| 4,719,190 | 1/1988 | Drago et al. ............... 502/227 X |

FOREIGN PATENT DOCUMENTS

| 2201128 | 4/1974 | France . |
| 2320775 | 3/1977 | France . |
| 1443008 | 7/1976 | United Kingdom . |
| 1518034 | 7/1978 | United Kingdom . |

Primary Examiner—W. J. Shine
Attorney, Agent, or Firm—A. Thomas S. Safford

[57] ABSTRACT

The invention relates to a process for the preparation and activation of a catalyst, comprising a stage of fabricating a support consisting at least in part of at least one refractory oxide mineral, a stage of depositing on the support at least one metal from the platinum group, and a stage intended for forming on the support at least two metal halides of the Lewis acid type. Between the deposition of the metal halides of the Lewis acid type and the utilization of the catalyst in the reactor, the catalyst is subjected to an activation stage by being maintained in an acidic and nonoxidizing or reducing medium at a temperature between 300° and 475° C. so that its final content of a promoter metal of the zirconium, molybdenum tungsten or titanium type ranges from 0.15 to 1 percent, based on the weight of the support.

14 Claims, No Drawings

PROCESS FOR THE ACTIVATION OF HALOGENATED CATALYSTS AND CATALYSTS OBTAINED BY SAID PROCESS FOR UTILIZATION IN HYDROCARBON CONVERSION PROCESSES

The present invention relates to a novel process for activation of halogenated catalysts containing a metal from the platinum group and at least two types of Lewis sites bound to the support, namely, Lewis sites based on zirconium, molybdenum, tungsten or titanium, and Lewis sites based on aluminum, boron or gallium. The invention further relates to the catalysts so activated, as well as to their utilization in hydrocarbon conversion processes.

It is known that catalysts having an aluminum halide and a platinum-group metal can be used in many processes for the treatment of hydrocarbons, such as the isomerization of paraffins, the alkylation of aromatic hydrocarbons or that of paraffinic hydrocarbons with olefins, the cracking or hydrocracking of hydrocarbons, and, finally, the transalkylation or isomerization of aromatic hydrocarbons. Such catalysts, and in particular those for the isomerization of paraffins, have been described in the literature, for example, in French patents 2,320,775, 2,206,124, 2,201,128 and 1,546,658 and in British patent 952,348.

These catalysts generally comprise a support which may be an alumina, a silica, a silica alumina, an aluminosilicate, or a mixture thereof. Among the known isomerization catalysts are those comprising a noble metal, particularly platinum, with which may be associated tin, nickel, germanium, rhenium, lead, or the metals of groups Ib, IIb, Vb, VIIb, III and IV of the periodic table of the elements, and further comprising metal halides of the Lewis acid type, that is, of the type having —$OMX_2$ groupings, where X is a halogen atom, and in particular a chlorine atom, and M is an atom of a metal, such as aluminum in particular.

Of these catalysts, those known as bimetallic, that is, comprising a platinum-group metal associated with Lewis sites formed in particular by the halides of a metal called "promoter", such as zirconium, molybdenum, tungsten or titanium, have already been found (see French patent 2,320,775) to have improved catalytic activity through a synergistic effect of that promoter.

In pursuing their work in this field, the Assignees have demonstrated that the properties of such bimetallic catalysts can be considerably improved by subjecting catalysts of this type to a stage of activation under specific conditions between the stage of actual preparation of these catalysts and the stage of their utilization in the reactors in which the reaction to be catalyzed is carried out.

In particular, the improvement in catalytic activity resulting from the presence on the catalyst support of Lewis acids based on zirconium, molybdenum, tungsten or titanium can be considerably enhanced by optimizing the final activation conditions of the catalyst. It has in fact been established that:

On the one hand, the activity is improved by the formation of Bronsted sites of the type —$OMX_3H$ and —$OM'X_4H$ (where M may be aluminum, boron or gallium, M' may be zirconium, molybdenum, tungsten or titanium, and X may be a halogen such as chlorine or bromine), whose formation from the Lewis sites requires a substantial heat input.

On the other hand, the excessive increase in the temperature of the catalyst tends on the contrary to result in the liberation of halides of zirconium, molybdenum, tungsten or titanium, which is attended by an appreciable and irreversible decrease in catalyst activity.

Finally, good catalyst activity is obtained only when the activation stage is carried out under specific conditions, that is, in an acidic and nonoxidizing or reducing medium.

The present invention thus seeks to achieve a substantial improvement in the activity of halogenated catalysts containing a metal from the platinum group and having at least two types of Lewis sites bound to the support, through a stage of activation at a given temperature and in the presence of an appropriate fluid, this activation stage being carried out between the stage of actual manufacture of the catalyst and the stage of its utilization in a reactor.

To this end, the invention has as one embodiment a process for the preparation and activation of a catalyst, comprising a stage of fabricating a support consisting at least in part of at least one refractory oxide mineral, a stage of depositing on the support at least one metal from the platinum group, and a stage intended for forming on the support at least two metal halides of the Lewis acid type, the first halide belonging to the family of the halides of zirconium, molybdenum, tungsten or titanium, and the second halide belonging to the family of the halides of aluminum, boron or gallium, characterized in that between the deposition of said metal halides of the Lewis acid type, or of a precursor of these halides, such as their alkylated derivatives, and the utilization of the catalyst in the reactor the catalyst is subjected to an activation stage by being placed in an acidic nonoxidizing or reducing medium at a temperature between 300° and 475° C. so that its final content of a metal of the zirconium, molybdenum, tungsten or titanium type ranges from 0.15 to 1 percent, based on the weight of the support.

A further embodiment of the invention is the catalysts obtained by carrying out the process described above.

Still another embodiment of the invention is the utilization of such a catalyst in a hydrocarbon conversion process, especially the isomerization of alkylaromatic hydrocarbons and the alkylation of paraffins or of aromatic hydrocarbons with olefins.

The acidic or nonoxidizing or reducing medium used in the activation stage of the process of the invention advantageously contains a hydrohalic acid or a hydrohalic acid precursor such as, preferably, hydrochloric acid or an organic chloride and, optionally, hydrogen and/or a gas that is inert to the constituents of the catalyst. Preferably such a medium would contain from 5 to 100 percent by weight of anhydrous hydrochloric acid and/or from 0 to 20 percent by weight of hydrogen.

The supports of the catalysts of the invention comprise refractory substances having an adequate specific surface and pore volume and having, moreover, chemical surface functions. The specific surface may range from 1 to 500 $m^2$ per gram and preferably ranges from 100 to 350 $m^2$ per gram, the specific pore volume being greater than 0.1 $cm_3$ per gram. The substance may be an alumina, a silica, a silica alumina or an aluminosilicate, magnesia, zirconia, an oxide of gallium, titanium, zirconium, thorium or boron, or a mixture of such oxides.

Particularly well-suited aluminas are the gamma- and eta-aluminas prepared by heat treatment at about 400°–850° C. These aluminas serve as support for the other components of the catalyst and should therefore preferably be substantially free of sodium. Calcination may be advisable, but care should be taken to carry it out at such temperature that the —OH groups of constitution, so called, are not completely eliminated during the treatment. In the case of an alumina with a specific surface of 5 m$^2$/g or greater, for example, the calcination may be carried out at from 400° to 1,000° C., and preferably from 400° to 800° C. The support itself is fabricated in a form that determines the shape of the finished catalyst, that is, in the form of spheres, pellets, granules or extrusions, as the case may be.

The most advantageous catalysts are those where the content of platinum-group metal (platinum, ruthenium, rhodium or palladium) ranges from 0.02 to 2 percent, based on the weight of the support. To obtain satisfactory catalytic properties, the content of this metal should preferably be greater than 0.10 percent; however, in view of the cost of the metal, it is preferably limited to 0.80 percent. The deposition on the support is effected by means known per se, for example, by impregnation with solutions containing said metals in either anionic or cationic form. The support can then be dried, also in a known manner, and then optionally calcined in a reducing atmosphere at a temperature which generally ranges from 400° to 600° C.

The stage intended for forming on the support at least two metal halides of the Lewis acid type may be carried out in several ways, all known per se, whose characteristics are outlined below.

A first method has been described in British patent 952,348, for example, in connection with the deposition of an aluminum halide. With this method, a precursor of the Lewis site is deposited by the action of a trialkylaluminum, and in particular of triisobutylaluminum, in an anhydrous medium, the Lewissite precursor being thus fixed by elimination of one molecule of isobutane. The product so obtained is then converted to aluminum dihalide by reacting it with anhydrous hydrochloric acid.

A variation of the foregoing method has been described in French patent 2,206,124, in which the precursor of dichloroaluminate is prepared by reacting the support with a hydrocarbylaluminum halide, again in an anhydrous medium, before being converted to dichloride, also with hydrochloric acid.

A third and more direct method, described in French patents 2,202,128 and 2,320,775, consists in making direct use of the reaction of the support with the metal halide. Since the latter is a solid, it is sublimed at elevated temperature, preferably above 200° C., in the presence of a diluting gas.

Each of these methods lends itself to the deposition of the two metal halides of the Lewis acid type necessary for preparation of the catalysts which are the subject of the present invention. However, so far as the deposition of the halides of zirconium, molybdenum, tungsten or titanium is concerned, a simpler method may consist in depositing on the support, by impregnation, salts of these metals, such as their nitrates, chlorides or oxalates. This impregnation can thus be carried out in a perfectly homogeneous manner at the desired metal content. The conversion to Lewis halides is then effected during the subsequent stage of contacting with hydrochloric acid in particular or with a precursor of that acid, such as an alkyl halide, for example.

Regardless of the procedure used to form the Lewis sites, the preparation by the methods outlined of the halogenated catalyst comprising a support composed at least in part of a refractory oxide mineral, a metal from the platinum group and at least two metal halides of the Lewis acid type will result in catalysts of substantially the same nature. However, the Applicants have been able to establish that, surprisingly, the activity of these catalysts is significantly increased when the Lewis sites are converted to Bronsted sites by reaction with a hydrohalic acid, generally hydrochloric acid, at elevated temperature, that is, above a temperature of the order of 200° C., and preferably above 300° C., provided that this procedure is carried out in a nonoxidizing or reducing medium, in other words, in the presence of a gas composed at least in part of hydrogen.

Moreover, when halides of a promoter metal are used, such as the halides of zirconium, molybdenum, tungsten or titanium, it is observed that the content of these halides decreases steadily as the temperature rises above 300° C., which has as a direct consequence a decrease in catalytic activity due to the synergism between the two types of active sites. The invention seeks to overcome this drawback in that the final activation of the catalyst is carried out in a nonoxidizing medium, and preferably in a reducing medium, and in the presence of a gas containing a hydrohalic acid, and preferably hydrogen, at a temperature between 300° and 475° C.

This activation stage is advantageously carried out with a catalyst which at the outset has a slight excess of a metal halide of zirconium, molybdenum, tungsten and/or titanium to compensate for the predictable decrease in the content of these metal halides during the activation stage. This excess of metal halide may advantageously range from 5 to 200 percent, based on the final content, as the case may be.

At the end of the activation stage, whose duration generally ranges from one-quarter hour to two hours, the catalyst will advantageously have:

A content of a metal of the zirconium, molybdenum, tungsten or titanium type of from 0.15 to 8.0 percent, based on the weight of the support;

a content of added aluminum, of boron or of gallium of from 1 to 15 percent, based on the weight of the support; and a total halogen content of from 2 to 15 percent, based on the weight of the support.

Moreover, the ratio of platinum-group metal to promoter metal of the activated catalyst is advantageously between 0.25 and 5.

The examples which follow will serve to demonstrate the superiority of the catalysts activated in accordance with the present invention over the prior art without, however, limiting the invention in any way.

EXAMPLE 1

This example relates to a mode of preparation of four catalysts and to a comparison of their activity in the hydroisomerization of n-pentane or n-hexane before and after the activation stage in accordance with the present invention.

The refractory support used for all catalysts is an alumina with the following average characteristics:

| | |
|---|---|
| Specific surface: | 200 m$^2$/g |
| Pore volume: | 0.50 cm$^3$/g |

-continued

| | |
|---|---|
| Average pore radius: | $50 \cdot 10^8$ cm (50 A) |
| Form: | Extrusions. 1.5 mm average diameter |

This alumina, calcined for 4 hours at 600° C. before the deposition of the various metals, will hereinafter be called support alumina.

The support alumina is divided into five lots of 100 g, four of which are then impregnated with the salts of zirconium, molybdenum, tungsten and titanium, respectively, in solution in 250 cm³ of normal hydrochloric acid. After evaporation in a rotary evaporator, the catalyst is dried at about 120° C. and then calcined for 2 hours at 600° C.

Each lot is again immersed in a dilute, approximately 0.1N solution of hydrochloric acid. After drying at ambient temperature, the alumina is contacted with a circulating solution of hexachloroplatinic acid whose initial platinum concentration is such that after being dewatered and then dried at 120° C. the catalyst contains approximately 0.35% by weight of platinum. The solids are then calcined at about 530° C. in a muffle furnace.

Finally, the lots of solids are subjected to a reduction with hydrogen for about 1 hour at 500° C. They contain approximately 1.4 wt. % of chlorine and 0.33 wt. % of platinum.

Each of these lots is then subjected to a direct aluminum chloride treatment. Aluminum trichloride is sublimed in a stream of hydrogen (total pressure of gas stream, 1 atmosphere; partial pressure of aluminum trichloride, $3.999 \cdot 10^4$ Pa or 300 mm Hg). This treatment is carried out for about 3 hours, at a temperature of from 275° to 300° C., as the case may be. A first lot of control catalyst T1, containing only platinum and Lewis sites of the formula —O—AlCl₂, and four lots of unactivated bimetallic catalyst A1, B1, C1 and D1 containing about 5 to 6% chlorine are so obtained.

The characteristics of the unactivated catalysts so prepared are presented in Table 1 which follows.

TABLE 1

| Lot No. | Platinum content | Impregnating salt | Second (promoter) metal content | Chlorine content |
|---|---|---|---|---|
| T1 | 0.33 | — | — | 6.0 |
| A1 | 0.38 | ZrO(NO₃)₃, 2 H₂ | 0.60 | 6.2 |
| B1 | 0.36 | (NH₄)₆Mo₇O₂₄, 4 H₂O | 0.14 | 6.4 |
| C1 | 0.36 | (NH₄)₁₀W₁₂O₄₁, 5 H₂O | 0.30 | 6.4 |
| D1 | 0.36 | Ti₂(C₂O₄)₃, 10 H₂O | 0.22 | 5.9 |

A series of tests is then run with lot A1 to demonstrate the influence of temperature on the activation stage intended for converting the Lewis sites still present on the catalyst to Bronsted sites.

20 grams of catalyst A is swept for 1 hour with 5 liters of hydrogen containing 10% of anhydrous hydrochloric acid.

Five catalysts A2, A3, A4, A5 and A6, activated at different temperatures, are so obtained, and their activity is then tested in an isomerization test of n-hexane at 145° C. at a total pressure of 30 bar, with a molar ratio of hydrogen to hydrocarbon of 3, and with an hourly mass flow rate of n-hexane, based on catalyst weight, of 5.

The activation temperatures of the catalysts and the results of the tests are presented in Table 2 which follows.

TABLE 2

| Lot No. | Activation temperature °C. | Final Zr content | Atomic ratio Zr/Pt | Final chlorine content | n-Hexane conversion % |
|---|---|---|---|---|---|
| A2 | 275 | 0.60 | 3.4 | 6.9 | 70 |
| A3 | 300 | 0.60 | 3.38 | 6.8 | 78 |
| A4 | 400 | 0.47 | 2.65 | 6.4 | 83 |
| A5 | 450 | 0.38 | 2.14 | 6.4 | 87 |
| A6 | 575 | 0.16 | 0.9 | 5.9 | 75 |

It is apparent from this table that since the zirconium content decreases steadily as the temperature rises (while the platinum content remains practically constant), there is a temperature optimum between 300° and 475° C., which makes it possible to take advantage of the synergism due to the presence of the promoter metal, which here is zirconium.

Moreover, it has been found that at the optimum temperature of about 450° C. the conditions for good activation (acidic and nonoxidizing or reducing medium) have an influence on the conversion that is not negligible: A portion of sample A1, simply swept with nitrogen for 1 hour at 450° C., only exhibits a conversion rate of 80% as against the 87% shown in Table 2.

Other conversion tests, performed on n-pentane and resulting in lower conversion rates than those run on n-hexane, were then carried out— with catalysts T5, A5, B5, C5 and D5, obtained by subjecting the catalysts T, A, B, C and D of Table 1 to an activation in accordance with the present invention (at 450° C., by sweeping with hydrogen containing about 10% hydrochloric acid), and with catalysts T6, A6, B6, C6 and D6, also obtained from the catalysts of Table 1 but by subjecting them to an activation of a type known from French patent 2,320,775 (sweeping with nitrogen at 500° C. for two hours).

The conversion tests were run under the following conditions: Normal pentane and hydrogen are passed at a pressure of 3 MPa (30 bar) and a temperature of 150° C. over 10 cm³ of catalyst placed in a reactor. The hourly space velocity is 3, and the molar ratio of hydrogen to hydrocarbon is 2.5. Isopentane is practically the only product of the reaction. The activity of the various catalysts can therefore be estimated on the basis of the conversion to isopentane.

The characteristics of the catalysts and the results of the tests are presented in Table 3 which follows.

TABLE 3

| Catalyst activated at 450° C. | Atomic ratio promoter/ platinum | n-Pentane conversion (wt %) | Catalyst activated at 500° C. | Atomic ratio promoter/ platinum | n-Pentane conversion (wt %) |
|---|---|---|---|---|---|
| T5 | — | 65.0 | T6 | — | 43 |
| A5 | 2.14 | 78.4 | A6 | 1.8 | 62 |
| B5 | 0.60 | 76.5 | B6 | 0.5 | 60 |

TABLE 3-continued

| Catalyst activated at 450° C. | Atomic ratio promoter/ platinum | n-Pentane conversion (wt %) | Catalyst activated at 500° C. | Atomic ratio promoter/ platinum | n-Pentane conversion (wt %) |
| --- | --- | --- | --- | --- | --- |
| C5 | 0.70 | 76.7 | C6 | 0.6 | 56 |
| D5 | 2.0 | 76.0 | D6 | 1.6 | 55 |

The measured conversions show—
that there is indeed a synergism due to the presence of a promoter (zirconium, molybdenum, tungsten and titanium), the activities of the lots A, B, C and D being always higher than the activity of the control lot T, and
that this synergism is optimum when the activation stage is carried out in an acidic and reducing medium at a temperature between 300° and 475° C., with a gain in conversion on the order of 15 to 20 points over the prior art.

EXAMPLE 2

This example relates to the preparation of three other catalysts and to a comparison of their activity in the hydroisomerization of n-hexane before and after the activation stage in accordance with the present invention.

The support alumina of these catalysts is the same as that used in Example 1. The zirconium and the platinum are deposited in the same manner. A first lot (catalyst T) containing only platinum is prepared as a control, while zirconium is added as a promoter to a second lot (catalyst E).

20 grams of each of these two lots of catalyst is placed under an inert gas in a stainless-steel reactor, into which 50 cm$^3$ of a normal solution of dichloroethylaluminum in normal heptane is then introduced at 50° C. After one hour, the solvent is eliminated and the solid obtained is dried.

The remaining fraction of each of the above two catalysts is then subjected to a stage of activation in accordance with the present invention, 10 grams of each being swept for two hours at temperatures ranging from 300° to 400° C., as the case may be, with anhydrous hydrochloric acid and, optionally, a certain proportion of hydrogen and an inert gas. Catalyst lots T1, E1 and E2 are so obtained. Their characteristics and activity are given in Table 4 which follows.

The activity of these catalysts was determined in an n-hexane isomerization test at a temperature of 150° C. and a pressure of 30 bar, in the presence of hydrogen, at an hourly space velocity of 5. The molar ratio of hydrogen to hydrocarbon was maintained at 3.

The results of this test are presented in Table 4 below.

TABLE 4

| Catalyst lot | Activation temperature, °C. | Pt content | Zr content | Cl content | Promoter/ platinum ratio | n-Hexane conversion (wt %) |
| --- | --- | --- | --- | --- | --- | --- |
| T | — | 0.30 | — | 8.9 | — | — |
| E | — | 0.30 | 0.80 | 8.5 | 5.7 | — |
| T1 | 300 | 0.30 | — | 5.8 | — | 68 |
| E1 | 300 | 0.30 | 0.31 | 5.7 | 2.2 | 75 |
| E2 | 400 | 0.30 | 0.25 | 5.50 | 1.8 | 82 |

It is apparent that after activation in accordance with the present invention the bimetallic catalyst has the best activity, comparable to that of the lots prepared in Example 1.

EXAMPLE 3

This example relates to the preparation of two other catalysts and to the measurement of their catalytic activity after the activation stage in accordance with the present invention.

Here, too, zirconium is deposited first, and then platinum, by the mode described at the start of Example 1. A catalyst F whose characteristics are given further on in Table 5 is so obtained.

20 grams of this catalyst is placed in a reactor with 15 cm$^3$ of dry n-heptane under a nitrogen atmosphere. Then 50 ml of triethylaluminum is added dropwise with stirring, and a gas stream of nitrogen is then bubbled into the solution at 90° C. After one hour, the catalyst is isolated and dried under an inert atmosphere.

Half of this lot of catalyst is then activated with anhydrous hydrochloric acid for two hours at 300° C., and the other half at 400° C.

Two lots of catalyst F1 and F2 are so obtained, and their activity is measured by carrying out a conversion by isomerization of n-hexane under the conditions indicated in Example 1.

The results of these tests are presented in Table 5 which follows.

TABLE 5

| Lot | Activation temperature (°C.) | Pt content | Zr content | Cl content | n-Hexane conversion (wt %) |
| --- | --- | --- | --- | --- | --- |
| F | — | 0.30 | 0.80 | — | — |
| F1 | 300 | 0.30 | 0.30 | 5.0 | 83.8 |
| F2 | 400 | 0.30 | 0.26 | 4.9 | 86.4 |

It is apparent that the bimetallic catalyst activated in accordance with the invention does have improved properties for the conversion of hydrocarbons, which are comparable to those of the catalysts of Example 1.

This specification is based upon French priority document, France No. 89 09630 filed Jul. 18, 1989, which is incorporated herein by reference.

We claim:
1. A process for the preparation and activation of a catalyst, comprising:
fabricating a catalyst support consisting at least in part of at least one refractory oxide mineral,
depositing on the catalyst support at least one metal from the platinum group,
forming on the catalyst support, and thereby completing the preparation of the catalyst, at least two metal halides of the Lewis acid type, the first halide belonging to the family of halides of zirconium, molybdenum, tungsten or titanium, and the second halide belonging to the family of the halides of aluminum, boron or gallium, and
activating the prepared catalyst by maintaining in an acidic and nonoxidizing or reducing medium at a temperature between about 300° and 475° C. until the final content of zirconium, molybdenum, tungsten or titanium in the catalyst ranges from 0.15 to 1 percent, based on the weight of the support.

2. A process as defined in claim 1, wherein the acidic and nonoxidizing or reducing medium of the activating step contains a hydrohalic acid or a precursor of a hydrohalic acid.

3. A process as defined in claim 1, wherein the medium of the activating step is acidic and nonoxidizing and contains hydrogen or a gas that is inert to the constituents of the catalyst.

4. A process as defined in claim 1, wherein the activating step is carried out so that at the end of that stage the ratio of platinum-group metal to other metal of the catalyst is between 0.25 and 5.

5. A process as defined in claim 1, wherein before the activating step, the content of halides of zirconium, molybdenum, tungsten or titanium of the catalyst is greater than from 5 to 200 percent of the final content of the activated catalyst.

6. A process as defined in one of claim 1, wherein the medium of the activating step is acidic and nonoxidizing and contains from 5 to 100 percent by weight of anhydrous hydrochloric acid.

7. A process as defined in claim 1, wherein the medium of the activating step is acidic and nonoxidizing and contains from 0 to 20 percent by weight of hydrogen.

8. A process as defined in claim 1, wherein the final content of aluminum, boron or gallium of the activated catalyst is from 1 to 15 percent by weight of the support.

9. A process as defined in claim 1, wherein the final halogen content of the activated catalyst is from 2 to 15 percent by weight of the support.

10. A process as defined in claim 1, wherein the platinum-group metal content of the activated catalyst is between greater than 0.1 and up to 8 percent, based on the weight of the support.

11. A process as defined in claim 1, wherein the refractory oxide mineral entering into the composition of the support is selected from the group consisting of alumina, the aluminosilicates, silica, zirconia, thoria, magnesia, gallium oxide, titania, boric oxide, and any mixture of these compounds.

12. A catalyst obtained by carrying out the process defined in claim 1.

13. A process for the preparation and activation of a catalyst, comprising:
fabricating a catalyst support consisting at least in part of at least one refractory oxide mineral,
depositing on the catalyst support at least one metal from the platinum group,
forming on the catalyst support, and thereby completing the preparation of the catalyst, a precursor of at least two metal halides of the Lewis acid type, the first halide belonging to the family of halides of zirconium, molybdenum, tungsten or titanium, and the second halide belonging to the family of the halides of aluminum, boron or gallium, and
activating the prepared catalyst by maintaining in an acidic and nonoxidizing or reducing medium at a temperature between about 300° and 475° C. until the final content of zirconium, molybdenum, tungsten or titanium in the catalyst ranges from 0.15 to 1 percent, based on the weight of the support.

14. A process as defined in claim 13, wherein the precursor is the alkylated derivative of the desired metal halide.

* * * * *

UNITED STATES PATENT AND TRADEMARK OFFICE
CERTIFICATE OF CORRECTION

PATENT NO. :   5,151,400
DATED      :   September 29, 1992
INVENTOR(S):   Szabo et al.

It is certified that error appears in the above-identified patent and that said Letters Patent is hereby corrected as shown below:

Title page, Item "[73]" to add the second assignee as follows:

--; and AKZO N.V., Arnhem, Pay-Bas [Netherlands]--

Signed and Sealed this

Nineteenth Day of July, 1994

Attest:

BRUCE LEHMAN

*Attesting Officer*   Commissioner of Patents and Trademarks